United States Patent [19]

Henriksen et al.

[11] Patent Number: 4,540,015
[45] Date of Patent: Sep. 10, 1985

[54] ROTARY SHEER VALVE WITH WASH AND PURGE STATION

[75] Inventors: Melvin S. Henriksen, Santa Ana; Richard C. Meyer, La Habra, both of Calif.

[73] Assignee: Beckman Instruments, Inc., Fullerton, Calif.

[21] Appl. No.: 509,900

[22] Filed: Jun. 30, 1983

[51] Int. Cl.³ .......................... B08B 3/02; B08B 9/02
[52] U.S. Cl. .................................. 137/240; 134/166 C; 134/169 C; 137/625.11; 137/625.41; 137/625.46; 222/148
[58] Field of Search ............... 137/240, 625.11, 625.41, 137/625.46; 251/176; 222/148; 134/166 R, 166 C, 168 R, 168 C, 169 R, 169 C

[56] References Cited

U.S. PATENT DOCUMENTS

| | | | |
|---|---|---|---|
| 2,911,008 | 11/1959 | Du Bois | 137/625.11 |
| 3,114,393 | 12/1963 | Vlasic | 137/625.46 |
| 3,186,434 | 6/1965 | Hrdina | 137/625.11 |
| 3,246,667 | 4/1966 | Pemberton | 137/625.41 |
| 3,451,428 | 6/1969 | Pruett | 137/625.46 |
| 3,707,991 | 1/1973 | Shapiro | 137/625.11 |
| 3,752,167 | 8/1973 | Makabe | 137/625.46 |
| 4,156,437 | 5/1979 | Chivens et al. | 137/625.41 |
| 4,310,022 | 1/1982 | Cohen | 137/625.11 |

FOREIGN PATENT DOCUMENTS

| | | | |
|---|---|---|---|
| 590794 | 7/1947 | United Kingdom | 137/625.41 |
| 1334431 | 10/1973 | United Kingdom | 137/625.46 |

Primary Examiner—George L. Walton
Attorney, Agent, or Firm—W. H. May; A. Grant; G. T. Hampson

[57] ABSTRACT

A shear valve obtaining selective fluidic communication between fluid ports formed in a first member and fluid ports formed in a second member comprises a first seal with means for providing a fluidic seal between aligned ports and which separates the first and second members to form a passage, and a second sealing means to obtain a fluidic seal between the first and second members and enclose the passage. A fluid port is provided to introduce wash solution into the passage formed between the first and second members and a drain port is provided to remove the wash solution introduced between the first and second members, so that a wash and purge operation may be performed to cleanse the sealing surfaces of the valve.

4 Claims, 1 Drawing Figure

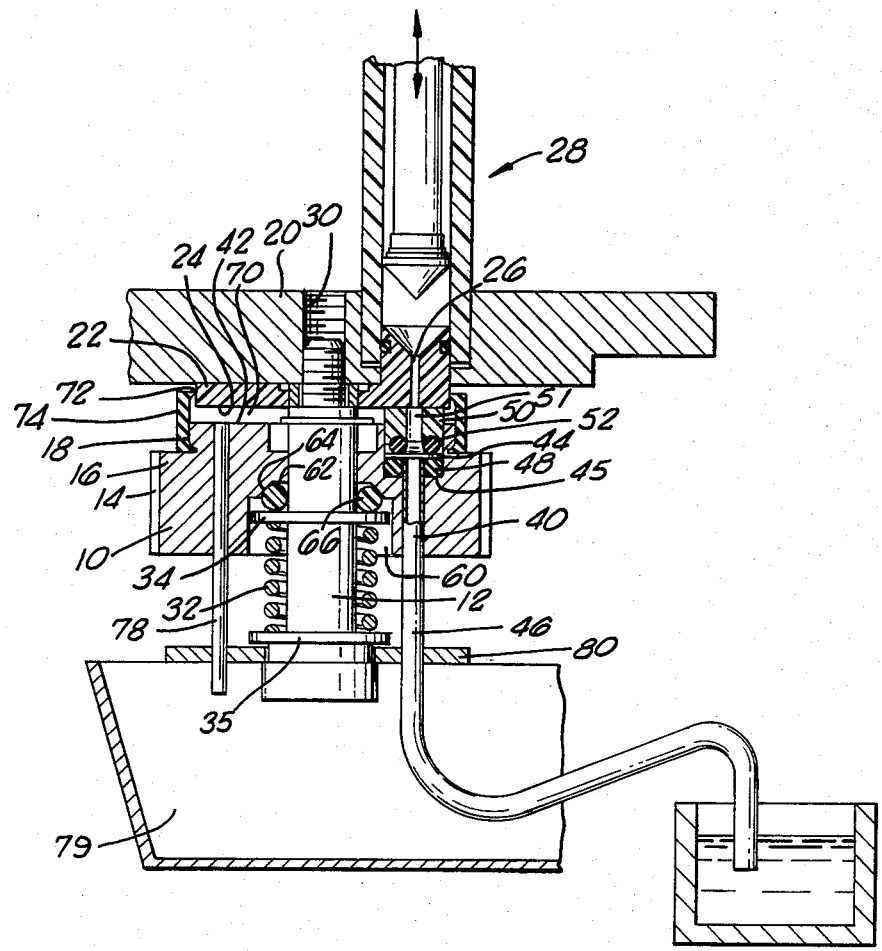

ROTARY SHEER VALVE WITH WASH AND PURGE STATION

TECHNICAL FIELD

This invention relates to shear valves which align selected ports for transferring fluids along various conduits.

BACKGROUND ART

Many types of linear and rotary shear valves are known. Generally, a shear valve comprises a stationary member having a flat surface, through which a single port is formed and connected to a supply or receiving fluid element. A moving member generally having a plurality of ports connected to individual fluid conduits engages the flat surface of the stationary member, generally through a number of sealing elements adjacent each individual port. The valve operates through sliding movement between the stationary and moving members to axially align one of the individual ports in the moving member with the port in the stationary member. Thus, by selectively moving the movable member, an individual port which it comprises can be aligned with the port in the stationary member to complete a fluidic path and flow fluid.

Shear valves generally suffer from a common problem relating to their ability to form a seal between the stationary and moving members. The sealing element positioned between the moving member and the stationary member must provide a leak free seal between the members even after a considerable amount of wear. This requires the face of the sealing element, which generally engages and slides against the surface of the stationary member, to maintain complete sealing engagement. If the surface on which the sealing element slides is adequately finished and adequate means of lubrication is provided to prevent significant wear of the sealing member, seal integrity can usually be easily maintained. However, many environments in which shear valves are used are contaminated with foreign materials and abrasives which significantly reduce the ability of the sealing element to maintain a leak proof seal.

For instance, when dirt, crystalline residues, or corrosives can adhere to or become embedded in the surface upon which the sealing element must slide, it can be easily understood that the increased wear which this may cause significantly reduces the life of the seal. This can easily lead to premature seal failure and leakage, which in turn can result in even more build-up of dirt, residues and corrosive materials.

Attempts to enclose the critical portions of the valve from the surrounding environment have been ineffective since leakage of fluids which the valve is transmitting can easily cause sufficient contamination to severely affect their life. Thus, sealing rings and enclosures alone have not been effective in significantly aiding performance of shear valves, particularly in environments where salts, oxides and corrosive agents are being directed by the valve.

DISCLOSURE OF THE INVENTION

The present invention is a rotary shear valve which comprises a structure permitting a purge and cleaning function to cleanse the sealing surfaces which sealing elements must engage. The mating faces of the moving and stationary portions of the valve are constructed to provide a passage through which rinse fluid may be flowed to wash and purge residue and contamination from the critical sealing surfaces of the valve. Rise fluid is provided through cooperation of existing ports formed in the valve where one of the conduits is used to flow a rinse solution which is directed by the valve. If none of the existing conduits of the valve are used to flow a wash solution, an alternate port may be added to accomplish wash and purge functions through this design. Rinse solution flowing through the valve is removed through a drain port included in the valve structure which directs fluid and debris from the sealing surfaces to a selected waste receptacle.

Additionally, an elastomeric seal is provided to securely enclose the area in which the sealing surfaces are located to prevent environmental contaminants from entering the sealing area and cause wear of the sealing surfaces of the valve.

The advantages of the presented invention are increased service life of the shear valve due to reduced wear of the sealing surfaces from contaminants. This results from improved seal performance due to reduced wear and abrasion, thus reducing leakage. Additionally, reduced contaminants in the area of seal formation in the valve results in reduced cross contamination between the fluids flowed through the various ports which the valve directs. This is particularly important when the shear valve is used to direct fluids used in scientific analysis and testing. Enclosing the sealing area additionally reduces evaporation of fluid residues remaining on the sealing surfaces in this area, thus retarding contamination buildup, crystallization, etc. Periodic wash and purge events are directed sufficiently often to assure that crystalline residue and large amounts of contaminants cannot be built up.

Though the invention which Applicant is describing is embodied in a rotary type shear valve, a similar structure to permit wash and purge may be adapted to linear shear valves, as well as others that function with curvilinear motion.

DESCRIPTION OF THE DRAWING

The FIGURE depicts a cross section of a rotary shear valve illustrating a sealing element and a construction of a movable portion of the valve which permits washing and purge of contaminants and debris. Additionally, it depicts a piston pump which is shown as an example of a fluidic element with which the shear valve can communicate.

BEST MODE OF THE INVENTION

Referring to the drawing, a cross section of a rotary shear valve is shown. The valve comprises a rotor 10 which is supported by and rotates about the bearing surface of a shoulder bolt 12. A lower portion of rotor 10 has gear teeth 14 formed around its circumference for engagement with a gear train (not shown) to rotate the rotor for operation of the valve. A recessed upper portion 16 forms shoulder 18 which provides a circumferential sealing surface. The rotor 10 is preferably made of a rigid plastic, however it may be constructed of a metal or other suitable material.

A frame member 20 supports a stator plate 22 which is fastened to it by one of a number of mechanical fastening means. The stator plate 22 is preferably circularly shaped and positioned for concentric alignment with the rotor 10. The stator plate 22 provides a downwardly directed sealing face 24 having a smooth surface finish which may be engaged by a sealing element 50 (later described) to provide a fluid tight seal. The stator plate 22 and the frame member 20 have a single port 26 bored through them to communicate with a fluidic element, such as a piston pump generally indicated as 28. The stator plate 22 is preferably made of a rigid plastic, however may be constructed of a metal or other suitable material.

The rotor 10 is mounted to the frame member 20 to obtain engagement of the sealing element 50 with the face 24 of the stator plate 22. A threaded bore 30 is formed in the frame member 20 to receive the bolt 12 positioned through and engaging the bearing surface of the rotor 10. A spring 32 applies axial force against the rotor 10 to urge it upwardly and apply force to the sealing surfaces comprised in the valve. Washers 34 and 35 are provided to position the spring and to distribute spring force over an expanded surface area.

The rotor 10 has a plurality of ports bored axially through its body at approximately a mid point from its center to its outer diameter. The ports 40 are generally equally spaced from one another and concentric with the rotor 10. The upwardly directed surface 42 of rotor 10 has a recessed bore 44 concentrically formed above each port 40 to provide a shoulder 45 against which a seal may be made. Each port 40 is diametrically sized to receive a delivery tube 46 with sliding fit.

Each delivery tube 46 has a seal 48 formed on one end. A delivery tube 46 is positioned through a port 40 so that the seal 48 formed on the end of the tube engages the shoulder 45 formed by the recessed bore 44 adjacent each port 40. A sealing element 50 having an O-ring seal 52 at a lower portion is inserted into each recessed bore 44 above the seal 48 of each delivery tube 46. The O-ring seal 52 of the sealing element 50 engages the outer wall of the recessed bore 44 and the upward surface of each seal 48 on the end of the delivery tube 46 to provide a liquid tight seal between the sealing element 50 and the tube 46 and the rotor 10.

A sealing element 50 of the type described is positioned in a recessed bore 44 adjacent to each port 40 formed through the rotor 10. Each sealing element 50 has a central opening 51 communicating with the passage of the delivery tube for fluid flow. Each sealing element 50 is preferably constructed of Teflon material to obtain the benefits of reduced friction and improved sealing. Other materials, however, may be suitable. The upward face of each sealing element 50 is machined flat to permit fluid tight engagement with the flat face 24 of the stator plates 22.

The rotor 10 is urged upwardly towards the stator plate 22 axially along the bolt 12 by the spring 32. A downwardly facing bore 60 is formed in the bottom of rotor 10 to provide a shoulder 62 for a sealing surface. A concentric bevel 64 inwardly directed is formed around the shoulder 62 to enhance performance of the seal which it engages. An O-ring seal 66 is positioned between the shoulder 62 formed in the rotor 10 and the washer 34 concentrically positioned about the bolt 12 on which the spring 32 applies force. The spring 32 applies upward force against the washer 34 which compresses the O-ring seal 66 against the shoulder 62 formed in the rotor 10 and against the surface of the bolt 12. The slight concentric bevel 64 formed on the shoulder 62 urges the O-ring seal 66 inwardly against the surface of the bolt 12. This aids in providing an effective fluid tight seal between the rotor 10 and the bolt 12.

The spring 32 urges the rotor 10 upwardly against the stator plate 22. The spring 32 thus applies force from the shoulder 45 of each recessed bore 44 adjacent to a port 40, through the seal 48 on the end of the delivery tube 46 to the sealing element 50, forcing the upward surface of the sealing element 50 against the face 24 of the stator plate 22. The force applied by the spring 32 maintains tight contact between the upward face of the sealing element 50 and the flat face 24 of the stator plate 22 to obtain a fluid tight seal. Additionally, each of the sealing elements 50 positioned in a recessed bore 44 obtains a fluid tight seal in the bore through O-ring 52 by the force applied. The O-ring 52 positioned around the lower portion of each sealing element 50 permits a range of movement for each sealing element 50 so that the face of the sealing element may completely engage with the flat surface 24 of the stator plate 22.

Each sealing element 50 is equally sized in length such that it protrudes by a selected amount above the upward surface 42 of the rotor 10 when the O-ring 52 and the seal 48 on top of the delivery tube 46 are compressed beneath it. This allows a passage 70 to be formed between the face 24 of the stator plate 22 and the upper surface 42 of the rotor 10 when each of the sealing elements 50 is brought into sealing engagment with the stator plate 22. It is this passage 70 which permits contaminants, residues and corrosives to be washed free from the sealing surfaces of the shear valve.

The outer edge 72 of the stator plate 22 provides a circumferential surface of a diameter closely approximating the shoulder 18 formed around the upward portion 16 of the rotor 10. An elastomeric sealing ring 74 of a generally cylindrical shape is positioned around the outward edge 72 of the stator plate 22 and the shoulder 18 of the rotor 10 to provide a radial seal between these elements, and circumferentially enclose the passage 70.

In operation, the shear valve is rotated to position one of the ports 40 through the rotor 10 in axial alignment with the port 26 formed through the stator plate 22 and frame member 20. This obtains a fluidic path from a delivery tube 46 connected to the port 40 to the fluidic element 28 through which fluids may flow. By rotating the rotor 10, successive ports 40 come into alignment with the port 26 to permit selectable fluidic paths for flow therethrough.

When a wash and purge function is desired to cleanse the sealing surfaces of the valve, the rotor 10 is rotated to a position which places a port 40 of the rotor 10 connected a delivery tube which flows rinse solution, in alignment with the port 26 and the stator 22 and frame member 20. In the example depicted having a pump 28 positioned above the port 26, the pump 28 may draw rinse solution into its chamber. The rotor 10 is then rotated to a position in which none of the ports 40 in the rotor is aligned with the port 26 in the stator 22 and frame member 20. The port 26 in the stator 22 and frame member 20 is thus positioned between an adjacent pair of sealing elements 50.

The pump 28 then discharges its volume or rinse solution which flows through the port 26 and into the passage 70 formed between the surface 24 of the stator plate 22 and the upward surface 42 of the rotor 10. The rinse solution flows through the passage 70 and to a drain tube 78 positioned through the rotor 10 to communicate between the passage 70 and a waste receptacle 79. The rinse solution flushing through the passage 70 cleanses the sealing face 24 of the stator plate 22 and the sealing elements 50 in the rotor to remove contaminants, residues, and corrosives and to purge them with the rinse solution through the drain tube 78. This wash and purge function may be provided sufficiently often to assure that no abrasive formations or corrosives are allowed to form on any of the mating surfaces of the valve. This substantially reduces wear of the sealing surfaces of the sealing elements of the stator plate face. It furthermore reduces any possibility of contamination between fluids flowed through any of the delivery tubes positioned through the rotor.

The drain tube 78 is preferably made of a sturdy material such as steel. In this configuration, a guide plate 80 may be positioned between the head of the bolt 12 and the lower washer 35 against which the spring is positioned. The guide plate 80 guides each of the delivery tubes 46 in alignment with the port 40 in the rotor 10 through which it is positioned. The guide plate 80 prevents pinching and bending of the delivery tubes 40 when the rotor 10 is rotated to a selected position. The steel drain tube 78 acts as a pin extending from rotor 10 which rotates the guide plate 80 along with the rotor 10 to assure that proper alignment between the guide plate and the ports of the rotor are maintained.

What is claimed is:

1. A shear valve for selectively transferring fluids from a plurality of fluid conduits to a fluid element comprising:
    a first member having a port in fluid communication with said fluid element and providing a sealing surface;
    a second member having a plurality of ports each of which is in fluid communication with one of said fluid conduits, and providing a sealing surface for each of said ports, said second member being movable relative to said first member to selectively align said ports in said second member with said port in said first member;
    first sealing means for providing fluid communication between said first member port and one of said second member ports when such second member port is aligned with said first member port and for closing each of said second member ports to any fluid communication when said second member is moved as that said ports are not aligned with said first member port, said first sealing means separating said first and second members to form a passage therebetween;
    second sealing means for providing a seal between said first and second members to enclose said passage;
    means for introducing a wash solution into said passage for cleansing exposed sealing surfaces of said first and second members within said passages; and
    a drain port communicating with said passage for removal of said solution from said passage.

2. The shear valve as in claim 1 wherein the means for introducing a wash solution into said passage includes said port in said first member.

3. The shear valve as in claim 1 wherein said fluid element comprises pump means for drawing said wash solution through one of said ports of said second member when said second member is in a first position with respect to said first member and for expelling said wash solution through said port in said first member into said passage when the second member is in a second position with respect to said first member.

4. A shear valve for selectively transferring fluids from a plurality of fluid conduits to a fluid element comprising:
    a first member having a port in fluid communication with said fluid element and providing a sealing surface;
    a second member having a plurality of ports each of which is in fluid communication with one of said fluid conduits, said second member being movable relative to said first member to selectively align said ports in said second member with said port in said first member;
    individual tubular sealing elements disposed about corresponding ports of said second member, said sealing elements slidably contacting and sealing against the first member sealing surface, the length of such sealing elements spacing the first and second members to form a passage therebetween;
    sealing means for providing a seal between said first and second members to enclose said passage;
    said fluid element comprising pump means for drawing a wash solution through a selected one of said ports of said second member when said second member is positioned to provide fluid communication between said selected port with said first member port and for expelling said wash solution through said first member port into said passage to claim exposed portions of said first member sealing surface when said second member is moved with respect to said first member such that said first member port is unaligned with any of said second member ports and such that said individual tubular sealing elements will close said second member ports to any fluid communication; and
    a drain port communicating with said passage for removal of said solution from said passage.

* * * * *